US012806895B2

(12) United States Patent
Vitomir

(10) Patent No.: US 12,806,895 B2
(45) Date of Patent: Nov. 24, 2026

(54) COMPOSITIONS AND METHODS OF CARPET AND THINSET REMOVAL

(71) Applicant: Protocol Environmental Solutions, Inc., Coquitlam (CA)

(72) Inventor: Sergio Vitomir, New Westminster (CA)

(73) Assignee: Protocol Environmental Solutions, Inc., Coquitlam (CA)

( * ) Notice: Subject to any disclaimer, the term of this patent is extended or adjusted under 35 U.S.C. 154(b) by 77 days.

(21) Appl. No.: 18/646,727

(22) Filed: Apr. 25, 2024

(65) Prior Publication Data

US 2024/0359453 A1 Oct. 31, 2024

Related U.S. Application Data

(60) Provisional application No. 63/498,479, filed on Apr. 26, 2023.

(51) Int. Cl.
*B32B 43/00* (2006.01)
*C09J 5/00* (2006.01)

(52) U.S. Cl.
CPC ............... *B32B 43/006* (2013.01); *C09J 5/00* (2013.01); *C09J 2203/314* (2013.01); *C09J 2301/302* (2020.08); *C09J 2301/502* (2020.08)

(58) Field of Classification Search
CPC ..... B32B 43/006; C09J 5/00; C09J 2203/314; C09J 2301/302; C09J 2301/502
See application file for complete search history.

(56) References Cited

U.S. PATENT DOCUMENTS

| | | | | |
|---|---|---|---|---|
| 8,828,917 | B2 | 9/2014 | Rieth et al. | |
| 11,401,402 | B2 | 8/2022 | Vitomir | |
| 2022/0010100 | A1 * | 1/2022 | Vitomir .................... | C11D 3/43 |

FOREIGN PATENT DOCUMENTS

| | | | |
|---|---|---|---|
| WO | 2022024668 | A1 | 2/2022 |

OTHER PUBLICATIONS

Sentinel Products Inc. "Removing Carpet & Carpet Adhesive with Sentinel 626" YouTube Video posted Jan. 6, 2018. Accessed at <https://www.youtube.com/watch?v=9yu041RbEMY> (Year: 2018).*

* cited by examiner

*Primary Examiner* — Alex B Efta
*Assistant Examiner* — Alexander S Wright
(74) *Attorney, Agent, or Firm* — Martin Fessenmaier; Umberg Zipser LLP

(57) ABSTRACT

Contemplated compositions and methods allow for simple and effective removal of carpet and/or modified thinset. In preferred embodiments, contemplated compositions include benzyl alcohol and optionally monoethanolamine and/or a modified cellulose thickener.

7 Claims, No Drawings

COMPOSITIONS AND METHODS OF CARPET AND THINSET REMOVAL

FIELD OF THE INVENTION

The field of the invention is compositions and methods for carpet and/or thinset removal during building maintenance, repair, and upgrade, especially as it relates to using an organic alcohol, optionally an alkaline activator, and/or a thickener.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Carpet and carpet tiles are often fixed to a subfloor using a pressure sensitive adhesive (PSA). While convenient for installation of carpet and carpet tiles to a (typically cementitious) subfloor, cleaning of residual PSA from the subfloor after removal of old or disused carpet or carpet tiles is a laborious process. Various products have been made available to assist in the removal of PSA and many of such products are water-based or pure solvent-type mixtures. The water-based products usually are comprised of a water-miscible solvent such as glycol-ethers as well as surface-active agents. For example, in WO 2022/024668, a method was contemplated that uses an aqueous liquid, such as water, in conjunction with "removal tape" to remove PSA on the surface of a member or article. The invention involves a "water peeling step" where the aqueous liquid is provided at an interface between the surface with the PSA and the "removal tape," which allows the aqueous liquid to take the place of the PSA as the removal tape is peeled off the surface with the PSA. Although interesting, the efficacy of such water-based products tends to be very weak, at best, and typically requires several applications until most of the PSA residue is removed. As a result, using such products requires a significant amount of time, which makes it a less desirable option to contractors.

On the other hand, pure solvent-type products for PSA removal are also becoming less acceptable for contractors because such products only soften the PSA which renders the PSA more sticky than prior to removal. Additionally, these solvent-type products can be flammable and/or have an undesirable odor, which, on indoor flooring projects, is particularly undesirable or even hazardous for use. Another drawback of the pure-solvent based products is the high level of regulated VOC's. Despite the drawbacks, other solvent-based products have been introduced that include a variety of additives, such as abrasive particles and ketal adducts (see e.g., U.S. Pat. No. 8,828,917). However, these products are designed as general-purpose strippers and, like pure solvent-type products, render the PSA even more sticky than prior to use of such removal products.

More recently, certain compositions have been disclosed that allow removal of PSA in an agglomerated and substantially non-sticky form using organic solvents in combination with a solid phase that contains a thickener, a dry lubricant, and a gelling agent as described in U.S. Pat. No. 11,401,402. Such a formulation advantageously produces a residue on the subfloor that can be easily removed. However, prior removal of the carpet or carpet tiles is needed, which remains a laborious process due to the significant adhesion of the PSA.

Thus, even though various compositions and methods of removing PSA in the context of carpet and carpet tile removal are known in the art, all or almost all of them suffer from several drawbacks, especially when it comes to case of use. Therefore, there remains a need for improved compositions and methods of removing PSA.

SUMMARY OF THE INVENTION

The inventive subject matter is directed to various simple and effective compositions and methods of removing carpet/PSA and removing modified thinset from a typically cementitious surface such as a subfloor or a wall. Advantageously, contemplated compositions are non-toxic, non-flammable, and environmentally benign. Moreover, contemplated compositions will typically not dissolve the PSA and as such avoid creation of a sticky phase.

In one aspect of the inventive subject matter, the inventors contemplate a method of removing carpet from a subfloor to which the carpet is affixed with a pressure sensitive adhesive (PSA) that includes a step of applying to the affixed carpet an organic solvent composition that includes an organic alcohol and optionally an alkaline activator. Most typically, the organic solvent composition is applied in an amount and for a time sufficient for the organic solvent composition to penetrate the affixed carpet and to soften the PSA, and upon softening of the PSA, the carpet is removed from the subfloor. Where desired, or needed, it is contemplated that such methods may also include a step of perforating or cutting the carpet before the step of applying the organic solvent composition.

In some embodiments, the subfloor comprises a cementitious material, the organic alcohol comprises benzyl alcohol, and/or the alkaline activator comprises an ethanolamine compound. For example, the organic alcohol may comprise benzyl alcohol and the alkaline activator may comprise monoethanolamine or diethanolamine. In further examples, the organic alcohol may be present in an amount of between 35-100 wt % (w/w), and/or the alkaline activator is present in an amount of between 1-10 wt % (w/w). In still further examples, the organic alcohol may present in an amount of between 95-100 wt % (w/w), and the alkaline activator may be present in an amount of between 0-5 wt % (w/w). Preferably, but not necessarily, the organic alcohol is benzyl alcohol, and the alkaline activator is monoethanolamine or diethanolamine. Most typically, the time for the organic solvent composition to penetrate the affixed carpet and to soften the PSA is between 1 and 6 hours, and after removal of the carpet no more than 10% of PSA, and in many instances substantially no PSA, remains on the subfloor.

In another aspect of the inventive subject matter, the inventor contemplates a method of removing residual modified thinset from a surface after removal of tiles from the surface. Such method will typically include the steps of applying to the residual modified thinset on the surface an organic solvent composition that includes an organic alcohol and optionally an alkaline activator and/or thickener. Most typically, the organic solvent composition is applied in an amount and for a time sufficient for the organic solvent composition to at least partially penetrate the modified thinset, thereby forming a scrapable solid. In a further step, the scrapable solid is then removed from the surface.

With respect to the surface, the alkaline activator and the organic alcohol, the same considerations as presented above apply. Preferably, but not necessarily, the thickener comprises a modified cellulose (e.g., hydroxypropylcellulose). Therefore, in some examples, the organic alcohol may be present in an amount of between 95-100 wt % (w/w), the alkaline activator may be present in an amount of between 0-5 wt % (w/w), and the thickener may be present in an amount of between 0-5 wt % (w/w). In further examples, the organic alcohol is benzyl alcohol, the alkaline activator is monoethanolamine or diethanolamine, and the thickener is hydroxypropylcellulose. Most typically, the time for the organic solvent composition to at least partially penetrate the modified thinset is between 1 and 6 hours, and the scrapable solid is in most cases a dry and non-sticky solid.

Consequently, the inventor also contemplates a kit for removal of carpet or modified thinset from a surface that includes an organic solvent composition that comprises an organic alcohol and optionally an alkaline activator and/or a modified cellulose thickener, and an instruction associated with the composition with instructions to (a) apply the composition to a carpet that is affixed to a surface with a PSA in an amount and for a time sufficient for the composition to penetrate the affixed carpet and to soften the PSA; and/or (b) apply the composition to residual modified thinset on a surface after tile removal from the surface in an amount and for a time sufficient for the composition to at least partially penetrate the modified thinset.

With respect to the surface, the alkaline activator, the organic alcohol, and the thickener, the same considerations as presented above apply. As will be readily appreciated, the kit may include the instructions printed on a container that holds the composition or printed on a brochure of leaflet packaged together with the composition, and/or the instructions may be provided in electronic form on a website that offers the product for sale.

Various objects, features, aspects, and advantages of the inventive subject matter will become more apparent from the following detailed description of preferred embodiments.

DETAILED DESCRIPTION

The inventor has now discovered various compositions and methods of removing carpet from a subfloor and/or removing modified thinset from a surface using a formulation that is simple, effective, and environmentally benign. Moreover, the formulation leaves no tacky residue and significantly facilitates carpet removal and removal of modified thinset.

In especially preferred aspects, contemplated formulations comprise benzyl alcohol and monoethanolamine (MEA) and/or diethanolamine (DEA) as a liquid product in which benzyl alcohol is used as a swelling agent and in which the ethanolamine is used as an alkaline activator that substantially accelerates the swelling properties of benzyl alcohol with respect to the polymeric material in the PSA and modified thinset. Most notably, using such formulations, easy removal of the carpet or modified thinset is possible in as little as a few hours after application.

Consequently, it should be appreciated that the compositions presented herein can be used in a variety of circumstances. For example, contemplated compositions can be employed to soften (but not dissolve) an underlying adhesive that was previously used to install carpets in flooring applications. In such use, the composition is a liquid and is applied on top the carpet that is to be removed (typically applied to saturation). After about 4-6 hours, the carpet can then be lifted from the floor and most (if not substantially all) of the adhesive will remain attached to the carpet, which can then be disposed as solid waste. In another preferred example, contemplated compositions can be employed to soften polymer based cementitious and cured thinset material (modified thinset) that is commonly used in attaching tiles to floors and walls. In such use, the composition can be applied as a liquid or as a gel and allowed to dwell for about 1-6 hours, until scraping of the material off the floor or wall becomes easy. Most typically, the composition is effective for removal of at least 90% of the modified thinset, and in many circumstances removal of all the modified thinset. While not limiting the inventive subject matter, the inventor contemplates that the compositions presented herein work by swelling the polymer content in the thinset, which results in separation of the polymer from the cementitious mix. This separation leads to destabilizing of the thin set and easy removal by scraping off the substrate.

There are many glue and adhesive removers on market but none of them can be used on large surfaces because they are flammable, toxic by exposure, and dissolve the adhesive, turning the adhesive into a sticky mass that is very hard to remove. Other products such as D-Limonene based products, are slow and do not provide easy removal of the adhesive. In contrast, the compositions presented herein are based on an organic (preferably aromatic) alcohol and an optional alkaline activator that accelerates the softening characteristics of the organic alcohol with respect to PSA and modified thinset. Advantageously, the compositions presented herein can also be readily thickened to produce a gel that can adhere to vertical surfaces. Among other organic alcohols, benzyl alcohol is especially preferred as it is not flammable, not a hazardous or toxic air pollutant, and is not regulated as a volatile organic compound in consumer products by the EPA or CARB (California Air Resources Board). In addition, benzyl alcohol is a polar solvent with a very slow evaporation rate and a relatively low KB (Kauri butanol) value as established by ASTM D 1133. These properties make benzyl alcohol a preferred solvent to soften but not dissolve most of the adhesive used in flooring and tile setting applications.

With respect to alternative organic alcohols, it is contemplated that numerous compounds and compositions may be suitable for use herein, including phenol-modified liquid hydrocarbon resins (e.g., NOVARES LS 5500, RUETASOLV DI), as well as various other polar solvents with low KB value. For example, β-phenethyl alcohol or cinnamyl alcohol. Likewise, while monoethanolamine is typically preferred as an alkaline activator, various other ethanolamines (e.g., DEA, TEA) and other alkaline components are also deemed suitable for use herein.

Most typically, the organic alcohol will be present in an amount of at least 20% (w/w), or at least 30% (w/w), or at least 40% (w/w), or at least 50% (w/w), or at least 60% (w/w), or at least 70% (w/w), or at least 80% (w/w), or at least 90% (w/w), or at least 95% (w/w), or even or at least 100% (w/w). Thus, suitable quantities of the organic alcohol will be in the range of between 20-40% (w/w), or between 30-60% (w/w), or between 40-80% (w/w), or between 60-90% (w/w), or between 80-90% (w/w), or between 85-95% (w/w), or between 90-97% (w/w), or between 95-99% (w/w). Thus, suitable quantities of benzyl alcohol will be about 90%+/−5%, about 93%+/−3%, about 95%+/−3%, or about 97%+/−3%.

Alkaline activators are in most embodiments preferred, but not necessarily required. Preferred activators in this composition are of alkaline nature that are miscible with benzyl alcohol. The alkalinity of the activator contributes to faster softening of the adhesive in the presence of benzyl alcohol. An example of such activators are the alkanol amines. Most preferred are MEA (monoethanolamine) and TEA (triethanolamine) or a mix of them. Among other suitable quantities, the alkaline activator will be present in an amount of at least 0.5% (w/w), or at least 1.5% (w/w), or at least 2.0% (w/w), or at least 2.5% (w/w), or at least 3.0% (w/w), or at least 3.5% (w/w), or at least 4% (w/w), or at least 5% (w/w), or at least 10% (w/w), or at least 20% (w/w). Thus, suitable quantities of the organic alcohol will be in the range of between 0.5-2.5% (w/w), or between 1-3% (w/w), or between 2-5% (w/w), or between 5-10% (w/w), or between 10-15% (w/w), or between 15-20% (w/w). Thus, suitable quantities of the alkaline activator will be about 0.5%+/−0.5%, about 1.0%+/−0.5%, about 2.0%+/−1%, or about 2.5%+/−1.5%, or about 4.0%+/−2.0%.

As will be appreciated, suitable thickening agents that can be used in this composition will be any thickening agents that are compatible with the organic alcohol and the alkaline activator. However, preferred thickening agents include cellulosic based thickening agents, and especially hydroxypropylcellulose (Klucel type). The concentration of the thickening agent in contemplated compositions will be sufficient to provide cling to a vertical surface for at least 60 minutes, or at least 2 hours, or at least 4 hours, or at least 6 hours. Therefore, contemplated quantities of thickening agents will typically be in the range of 0.1%-1.0% (w/w), or in the range of 1%-3% (w/w), or in the range of 2%-5% (w/w), or in the range of 5%-10% (w/w), or in the range of 10%-20% (w/w), or in the range of 20%-35% (w/w). However, in most cases, the thickener is present at about 1-2% w/w.

In view of the above, it should therefore be appreciated that the compositions presented herein can be applied in numerous manners, including pouring, spraying, brushing, etc., and that the compositions may remain on the treated surface for at least 1 hour, or at least 2 hours, or at least 4 hours or at least 6 hours, and typically no longer than 24 hours, or no longer than 12 hours, or no longer than 8 hours, or no longer than 6 hours.

For user case, the inventor also contemplates a kit for removal of carpet or modified thin set. Most typically, the kit may include that which is discussed above, specifically, a liquid composition comprising an organic alcohol and optionally an alkaline activator and/or a modified cellulose thickener. In some embodiments, the kit may also include instructions and means for application. For example, instructions to (a) apply the composition to a carpet that is affixed to a surface with a PSA in an amount and for a time sufficient for the composition to penetrate the affixed carpet and to soften the PSA; and/or (b) apply the composition to residual modified thin set on a surface after tile removal from the surface in an amount and for a time sufficient for the composition to at least partially penetrate the modified thin set. In terms of implements for application, the kit may include a paint brush, a gel applicator, and/or a sprayer (trigger or pump). The implements for application may vary depending on how a user plans to use the kit. For example, if a user wants to use the components directly on a carpet that is affixed to a surface, the kit may include a sprayer. However, if a user wants to use the components on modified thin set after tile removal, the kit may instead include a paint brush and/or gel applicator for use. Consequently, the inventors contemplate a variety of kits that differ depending on their intended use. Some kits may include no implements of application, one implement, two implements, or more implements of application.

Examples

Test 1:

Test panels were prepared as follows: To 5 concrete panels (A, B, C, D, and E) sized 10×10×1 inches a commercially available PSA (Pressure Sensitive Adhesive) was applied. This adhesive was generic carpet adhesive common in the flooring industry. Sections of 9×9 inches of carpet were applied on top of the adhesive and left to cure for 7 days. After 7 days, variations of the compositions and a control (d-Limonene) were applied to the prepared panels by soaking the carpet to saturation. At intervals of one hour, ease of carpet detachment was evaluated. The time at which the removal of the carpet from the substrate was easy was considered complete and was recorded as shown in Table 1.

TABLE 1

| Panel | Composition | Acceptable Removal time | Adhesive residue (%) left on concrete |
|---|---|---|---|
| A | BA100% | 6 hours | None |
| B | BA 97%, MEA 3% | 4 hours | None |
| C | BA 97%, TEA 3% | 5 hours | None |
| D | BA 75%, MEA 25% | 12 hours | 25% |
| E | D-Limonene 100% | 28 hours | 10% |

In Table 1, BA is benzyl alcohol, MEA is monoethanolamine, TEA is triethanolamine. As can be readily seen, compositions A-C were significantly better than compositions D and E, with composition B having the fastest removal performance.

Test 2:

On five concrete panels sized 10×10×1, a commercially available polymer based modified thinset material common in the tile industry was applied by trawling. After 7 days dwell time, variations of the compositions were tested and compared to a control (D-limonene). Ease of removal of the thinset layer by scraping was evaluated as a function of time as shown in Table 2.

| Panel | Composition | Acceptable Removal Time | Stickiness |
|---|---|---|---|
| F | BA 100% | 4 hours | Dry/None |
| G | BA 97%, MEA 3% | 3 hours | Dry/None |
| H | BA 97%, TEA 3% | 4 hours | Slight |
| I | BA 95.5%, MEA 3%, HPR 1.5% | 3 hours | Dry/None |
| J | D-Limonene 98.5%, HPR 1.5% | 36 hours | Slight |

In Table 2, BA is benzyl alcohol, MEA is monoethanolamine, TEA is triethanolamine, and HPR is hydroxypropylcellulose. As can be readily seen, compositions F-I were significantly better than control, with the formulations G and I having the fastest removal performance.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of removing carpet from a subfloor to which the carpet is affixed with a pressure sensitive adhesive (PSA), comprising:

applying to the affixed carpet an organic solvent composition that includes an organic alcohol and optionally an alkaline activator;

wherein the organic alcohol comprises benzyl alcohol and is present in an amount equal to or higher than 95 wt % (w/w);

wherein the organic solvent composition is applied in an amount and for a time sufficient for the organic solvent composition to penetrate the affixed carpet and to soften the PSA; and upon softening of the PSA, removing the carpet from the subfloor.

2. The method of claim 1, further comprising a step of perforating or cutting the carpet before the step of applying the organic solvent composition.

3. The method of claim 1, wherein the subfloor comprises a cementitious material.

4. The method of claim 1, wherein the alkaline activator comprises an ethanolamine compound.

5. The method of claim 1, wherein the alkaline activator is present in an amount of between 0-5 wt % (w/w).

6. The method of claim 1, wherein the time for the organic solvent composition to penetrate the affixed carpet and to soften the PSA is between 1 and 6 hours.

7. The method of claim 1, wherein after removal of the carpet substantially no PSA remains on the subfloor.

* * * * *